(12) United States Patent
Berger et al.

(10) Patent No.: US 7,404,541 B2
(45) Date of Patent: Jul. 29, 2008

(54) SOLENOID VALVE

(75) Inventors: Rolf Berger, Aichtal (DE); Volkart Diehl, Esslingen (DE)

(73) Assignee: Festo AG & Co., Esslingen (DE)

( * ) Notice: Subject to any disclaimer, the term of this patent is extended or adjusted under 35 U.S.C. 154(b) by 258 days.

(21) Appl. No.: 11/407,713

(22) Filed: Apr. 20, 2006

(65) Prior Publication Data
US 2007/0023720 A1 Feb. 1, 2007

(30) Foreign Application Priority Data
Jul. 26, 2005 (EP) .................................. 05400023

(51) Int. Cl.
*F16K 31/02* (2006.01)
(52) U.S. Cl. .................................. 251/129.16; 251/65
(58) Field of Classification Search .................. 251/65, 251/129.15, 129.16; 335/297
See application file for complete search history.

(56) References Cited

U.S. PATENT DOCUMENTS

| | | | | |
|---|---|---|---|---|
| 4,538,129 A | * | 8/1985 | Fisher | 335/230 |
| 5,161,779 A | * | 11/1992 | Graner et al. | 251/129.16 |
| 5,381,966 A | * | 1/1995 | Gernert, II | 239/585.3 |
| 7,032,879 B2 | * | 4/2006 | Hayashi | 251/129.09 |
| 7,097,150 B2 | * | 8/2006 | Sedda et al. | 251/129.16 |

FOREIGN PATENT DOCUMENTS

| | | |
|---|---|---|
| DE | 39 39 537 | 6/1991 |
| DE | 199 01 090 | 7/2000 |
| DE | 103 40941 | 3/2005 |
| EP | 0 722 061 | 7/1996 |

* cited by examiner

*Primary Examiner*—John K Fristoe, Jr.
(74) *Attorney, Agent, or Firm*—Hoffmann & Baron, LLP

(57) ABSTRACT

A solenoid valve comprises a valve chamber between a base body and a magnet head and in the valve chamber a magnet armature functioning as a valve member is located. The actuation of the magnet armature takes place by activation of an electromagnet means, which possesses a magnet core arrangement with a plurality of pole faces facing the magnet armature. In order to reduce the impact of the magnet armature a damping plate arrangement is located between the magnet armature and the pole faces, such plate arrangement being in the form of a material which is not ferromagnetic.

24 Claims, 2 Drawing Sheets

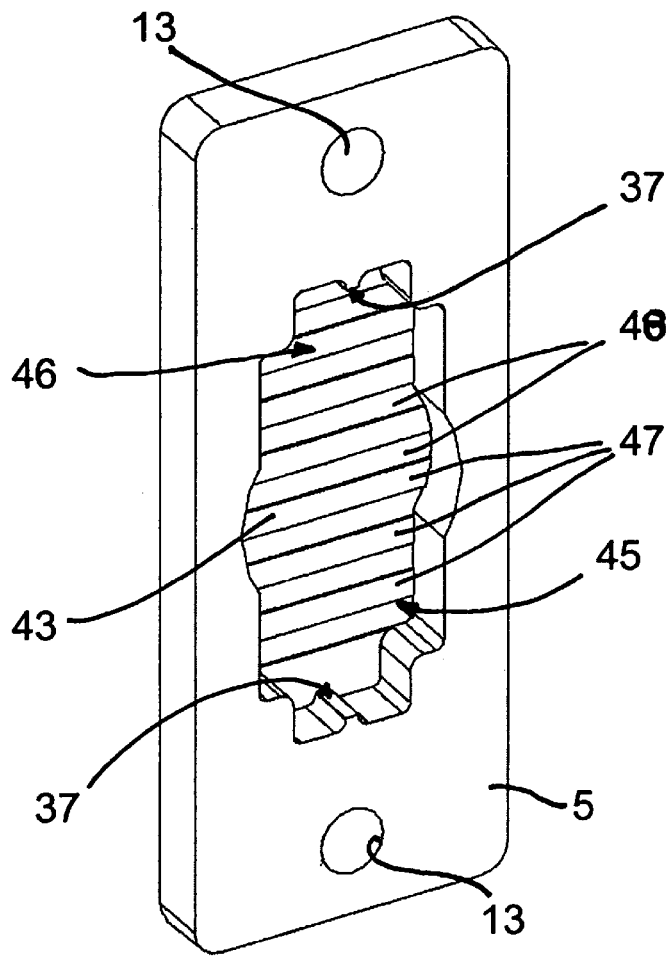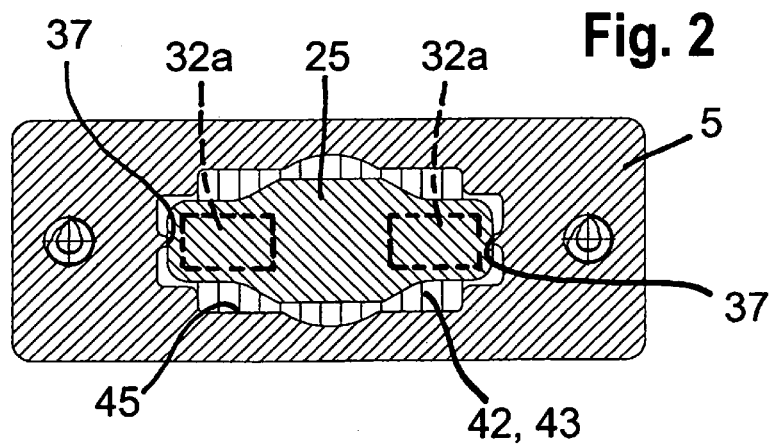

SOLENOID VALVE

BACKGROUND OF THE INVENTION

The invention relates to a solenoid valve comprising a base body having valve ducts extending through it and a magnet head having an electromagnet or solenoid means, which are arranged in sequence in the direction of a principal axis and between which a valve chamber communicating with a plurality of valve ducts is located, such chamber containing a magnet armature adapted to function as a valve member and able to be shifted in the direction of the principal axis, a stationary magnet core arrangement of the electromagnet means having a pole face arrangement facing the movable magnet armature, by which pole face arrangement the movable magnet armature is attracted for electrical activation of the electromagnet means and a damping plate arrangement arranged between the pole face arrangement and the movable magnet armature, such damping plate arrangement serving for reducing magnet armature impact.

THE PRIOR ART

A solenoid valve disclosed in the German patent publication 3,939,537 B4 of this type comprises a magnet head mounted on a base body having a solenoid and a plunger-like magnet armature able to be shifted in relation to same. The magnet armature is at one end designed to selectively clear or engage a valve seat. A stationary magnet core is coaxially opposite to the other end of the magnet armature and the magnet armature is pulled toward the magnet core on activation of the solenoid. A permanently magnetic disk arranged axially preceding the magnet core can latch the correspondingly shifted magnet armature until an opposite switching pulse is applied. Between the permanent magnet disk and the magnet armature a damping plate is arranged which is held by the permanent magnet disk and is accordingly ferromagnetic. It is intended to ensure mechanical shielding of the otherwise brittle magnet disk sensitive to impact.

The prior art solenoid valve is not designed for particularly high switching frequencies of the valve member constituted by the moving magnet armature. The relatively large mass of the valve member hinders the course of motion. Furthermore the release of the valve member from the damping plate is made more difficult because same directly forms a pole face and accordingly there is a direct contact between the pole face and the temporarily magnetic magnet armature.

SHORT SUMMARY OF THE INVENTION

One object of the invention is to provide a solenoid valve which, while being resistant to wear permits operation at high switching frequencies and, respectively, high switching rates of the moving magnet armature.

In order to achieve these and/or other objects appearing from the present specification, claims and drawings, in the present invention the movable magnet armature is designed in the form of a plate-like element with base faces aligned with the direction of the principal axis relative to which element a plurality of pole faces, of different magnetic polarity, are arranged, such faces being spaced apart in a direction athwart the principal axis, said damping plate arrangement comprising a non-ferromagnetic material and extending at least partially over each of the differently polarized pole faces.

Owing to the flat configuration the moving magnet armature has a relatively small mass, something which renders possible substantial acceleration rates. At the same time owing to the several adjacently placed pole faces a substantial attraction force may be exerted. All this renders possible switching cycles of the magnet armature at an extremely high frequency and switching speed. For instance, the switching frequency can be of the order of 1000 Hz. The high impact forces normally occurring here are reduced to an acceptable level for the valve components by the damping plate arrangement. The damping plate arrangement extends between each of the several pole faces and the respectively oppositely placed section of the plate-like magnet armature so that the impact is effectively elastically opposed and damped without there being any danger of running skew. Owing to the non-ferromagnetic design of the damping plate arrangement a direct contact between the magnet armature and the pole faces is prevented, something which opposes the development of extreme setting forces and ensures ready separation of the magnet armature from the damping plate arrangement in the opposite switching direction.

The German patent publication 19,901,090 A1 admittedly discloses a solenoid valve with a plate-like magnet armature and a magnet core arrangement comprising several pole faces. The magnet armature is furthermore provided with a damping element intended to deaden noise on impact of the magnet armature. However the damping element extends in the form of an annular marginal reinforcement only around the disk-like magnet armature so that the effective contact face between the damping element and the pole plate cooperating therewith of the magnet core arrangement is relatively small. Between the central portion of the magnet armature and the central pole face opposite thereto and provided at the frontal face of a cylindrical magnet core, there are no damping means at all. In the case of high frequencies the magnet armature can accordingly be excited to perform oscillations causing it to strike the central portion without damping, something which may possibly entail irreparable damage to the magnet armature in particular, something which may mean that the solenoid valve can only be operated at reduced power.

Further advantageous developments of the invention are defined in the claims.

The damping plate arrangement may be arranged both stationarily in relation to the magnet core arrangement and also directly on the magnet armature and able to move with it. A combined, divided manner of arrangement is also possible. It is an advantage however for the damping plate arrangement to consist of a single damping plate extending both over each of the differently magnetized pole face of the magnet core arrangement at least partly and preferably completely.

In accordance with a particularly preferred design the damping plate arrangement is an integral component of an intermediate plate, which is seated between the base body and the magnet head. Preferably it is here a question of an integral intermediate plate, something which permits particularly rational manufacture. The damping plate arrangement and preferably the entire intermediate plate may admittedly in principle consist of a non-ferromagnetic metal, but is preferably manufactured of plastic material.

The intermediate may possess a recess facing the base body in which the magnet armature is received and able to perform its switching movement in the direction of the principal axis. The floor of the recess preferably in this case constitutes the damping plate arrangement which is in the form of a single damping plate. The lateral wall of the recess is preferably so designed that it defines at least one guide face for steadying the magnet armature in a direction athwart the switching direction.

The intermediate plate may be mounted like a cover on the base body and form a limiting wall delimiting the valve chamber on the side facing the magnet head. More particularly, a provision is possible such that the intermediate plate together with the base body defines the valve chamber, which receives the moving magnet armature. Preferably the damping plate arrangement possesses a plate face without any interruptions. However, one or more openings, more particularly in the form of perforations, may be provided.

The damping plate arrangement can be so designed that at least in the portions covering pole face arrangement, and preferably all over, it has a constant wall thickness. The selected wall thickness can influence the spring characteristic of the damping plate arrangement and accordingly the impact force of the magnet armature. The said characteristic may also be influenced by the type of material of the damping plate arrangement.

A further possibility of influencing the damping properties of the damping plate arrangement is the selection of its geometry design. Instead of providing the damping plate arrangement on the side facing toward the middle moving magnet armature, it may here be provided with a surface structure including proud and recessed means. The surface structure or texture may more especially include a plurality of mutually parallel rib-like proud and intermediately placed groove-like recessed means. As an alternative a superficial structure is possible having a plurality of proud means with a punctuate distribution, as for instance a burl-like grain or structure.

The damping plate arrangement may also be employed to indicate the switching setting of the magnet armature. In this case an electrical circuit is preferably formed which possesses two electrically conductive contact faces formed on the proud means (forming the texture) of the damping plate arrangement, such faces belonging to a switch comprising the magnet armature as a switching element. On engagement of the magnet armature with the damping plate arrangement by way of the electrically conductive magnet armature the two contact faces are connected and the circuit is closed, this resulting in the production of a signal indicating the switching setting.

In the case of the contact faces it is more particularly a question of local metallized surfaces on one or preferably at least two proud means. In this context the damping plate arrangement may be designed in the form of a molded interconnected device (MID).

Particularly high switching speeds are able to be achieved if the moving magnet armature is placed loosely in the valve chamber in the direction of the principal axis and is not biased by a spring in one switching position. The switching over operation is in this case effected by magnetic force in the one direction and in the other by the pressure of the fluid in the valve chamber.

The solenoid valve preferably possesses a 2/2 functionality. However other switching functionalities may be adopted, as for example a 3/2 functionality.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 2 shows a cross section taken through the solenoid valve of the section line II-II in FIG. 1 near the intermediate plate comprising the damping plate arrangement.

FIG. 3 shows the intermediate plate in a perspective view looking toward a recess receiving the moving magnet armature during operation.

DETAILED ACCOUNT OF WORKING EMBODIMENT OF THE INVENTION

Figure 1:
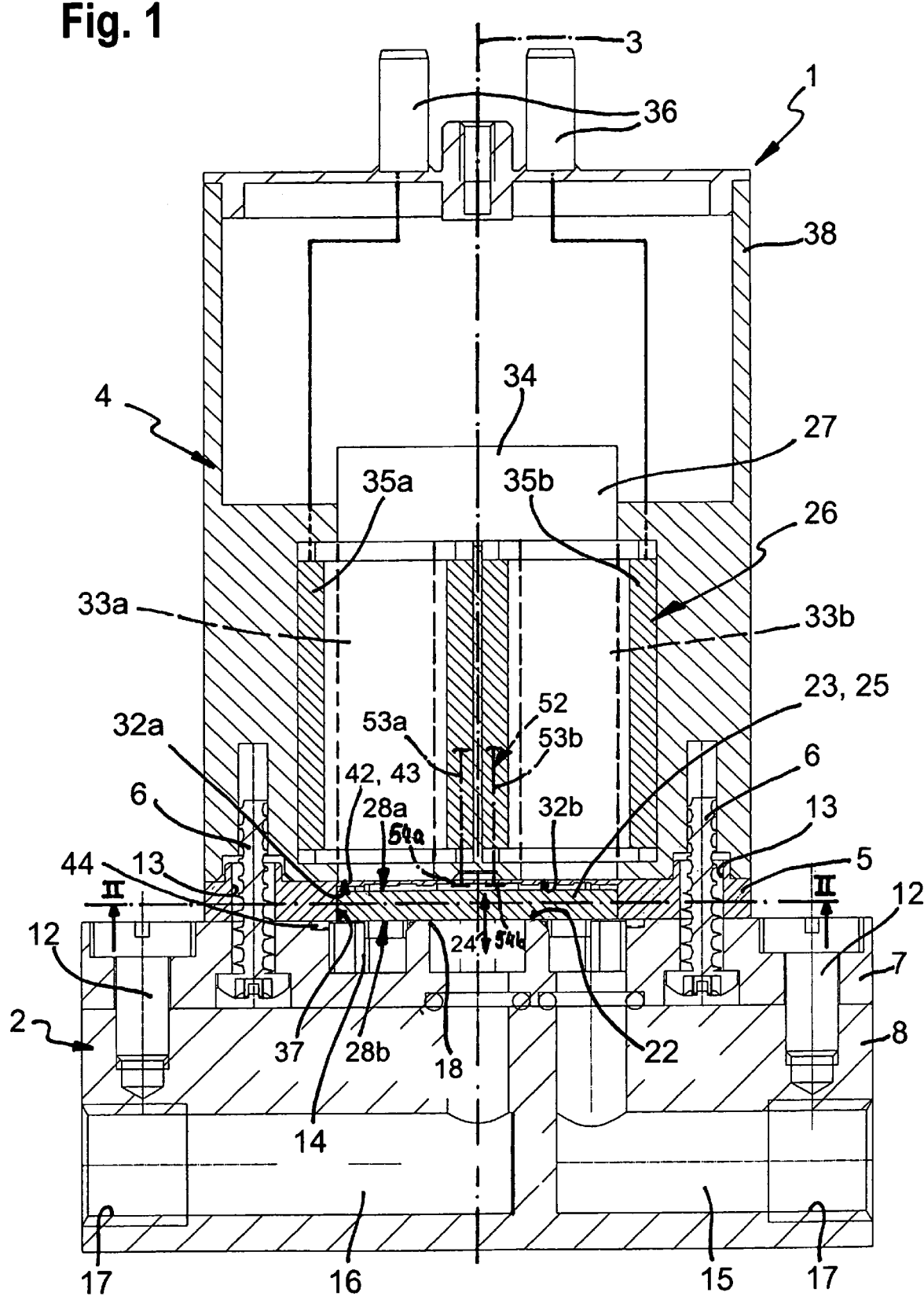
FIG. 1 shows a longitudinal section taken through a preferred embodiment of the solenoid valve of the invention in the deactivated state of the electromagnet means.

The solenoid valve generally referenced 1 comprises a base body 2 which in the embodiment is of multi-part design, and a magnet head 4 attached thereto in the direction of the principal axis 3. The principal axis 3 coincides in the embodiment with the vertical axis.

The magnet head 4 may be directly fitted to the base body 2. It is however preferable to have the design as illustrated in which for assembly an intermediate plate-like element is employed, which is termed the intermediate plate 5. The intermediate plate 5 is illustrated again in FIGS. 2 and 3.

The attachment of the solenoid valve 1 to the base body 2 can be with any suitable means, and is preferably effected using a screw connection. In FIG. 1 attachment screws 6 for this purpose are indicated.

The base body 2, illustrated by way of example, possesses a top part 7 associated with the magnet head 4 and preferably of plate-like design, and, attached thereto, a bottom part 8. The screw connection on the attachment screw 6 side bears against the top part 7. The top part 7 is secured by further attachment screws 12 or in some other fashion on the bottom part 8 underneath it.

The intermediate plate 5 possesses through openings 13 through which the attachment screw 6 extend without making threaded engagement. Accordingly the intermediate plate 5 is securely braced between the magnet head 5 and the base body 2.

In the transition zone between the magnet head 4 and the base body 2 there is a valve chamber 14. Valve ducts 15 and 16 open into the valve chamber and extend through the base body 2. The solenoid valve 1 of the working example is designed in the form of a 2/2 solenoid valve so that in this case two valve ducts 15 and 16 communicate with the valve chamber 14. Both valve ducts terminate at the side, opposite to the valve chamber 14, and at the outer face of the base body 2, where they are provided with attachment means 17, as for example internal screw threads, which permit the connection of fluid ducts leading to other equipment.

One of the valve ducts 15 is a supply duct. By way of it medium under pressure and more particularly compressed air is supplied. It communicates independently of the switching setting of the solenoid valve 1 continuously with the valve chamber 14 and also supplies the closing pressure for the valve member 23 to be explained.

The other valve duct 16 is a power duct. It is provided for connection with some load, the solenoid valve 1 being suitable for selectively opening or closing the connection between the supply duct 15 and the power duct 16.

The power duct 16 so opens in the valve chamber 14 that its opening 18 is orientated in the direction of the principal axis 3 and faces the magnet head 4. Its longitudinal axis preferably coincides with the principal axis 3. An annular valve seat 22, also orientated in the same manner, surrounds the opening 18 and is formed on the base body 2.

In the valve chamber 14 there is a valve member 23 able to be reciprocated in the direction of the principal axis 3. This valve member 23 is able to be switched over between two switching positions in a switching movement 24 indicated by a double arrow in the direction of the principal axis 3. The first switching position is indicated in FIG. 1 and in the working example is a closed position. In this case the valve member 23 engages the valve seat 22 and closes the opening 18. Simultaneously this means that the fluid connection between the two switching valve ducts 15 and 16 is interrupted. In the second switching position (not illustrated) the valve member 23 is shifted clear of the valve seat. In the working embodiment illustrated this second switching position constitutes an open position, because by way of valve chamber 14 a fluid connection is opened between the two valve ducts 15 and 16.

The switching stroke of the valve member 23 is relatively small in the working example.

The valve member 23 is constituted by a moving magnet armature 25, whose switching movement 24 is controlled by an electromagnet means 26 accommodated in the magnet head 4. The movable magnet armature 25 is constituted by a plate-like element consisting of temporarily magnetic material and preferably soft iron, such element being so arranged in the valve chamber 14 that its two mutually facing base faces 28a and 28b with a large area are orientated in the direction of the principal axis. The principal axis 3 extends at a right angle to the plane of the plate of the magnet armature 25.

During the switching movement 24 the magnet armature 25 preferably performs a translatory movement while maintaining its spatial alignment. However the magnet armature 25 could also perform a small tilting movement 24, possibly in addition.

The base face 28a, facing the magnet head 4, of the moving magnet armature 25 will be termed the top base face 28a in the following for the sake of simplification without entailing any limitation. Accordingly the opposite base face 28b will in the following be termed the ottom base face 28b.

The electromagnet means 26 comprises a stationary magnet core arrangement 27 with a pole face arrangement, which is composed of pole faces 32a and 32b magnetized in different directions in the activated condition of the electromagnet means 26. These pole face 32a and 32b extend in a common plane perpendicular to the principal axis 3 and adjoin the valve chamber 14 directly axially, same facing the top base face 28a of the moving magnet armature 25. The pole faces 23a and 23b are placed athwart the principal axis 3 and spaced apart.

In the working embodiment the magnet core arrangement 27 consists of a U-shaped magnet core with two magnet core limbs 33a and 33b 33 parallel to the principal axis 3, of which each end face facing the base body 2 forms one of two differently magnetized pole faces 32a and 32b. At their opposite end portions the magnet core limbs 33a and 33b are connected together by a transverse rib 34 of the magnet core.

The magnet core arrangement 27 is provided with a coil arrangement, which is in the working example composed of two coils 35a and 35b surrounding respectively one respective one of the magnet core limbs 33a and 33b coaxially. Using electrical contact elements 36, which are accessible from the outside, of the magnet head 4 the coil arrangement 35a and 35b and with it the electromagnet means 26 may be electrically activated or deactivated at will.

Instead of the U-shaped magnet core it is possible to have, for example, an E-shaped magnet core or to have any other suitable magnet core configuration resulting in having several pole faces, facing the magnet armature 25, with different directions of magnetization or polarity. The coil arrangement could for example also comprise only one coil or more than two coils.

On activation of the electromagnet means 26 the magnet armature 25 constituting the valve member 23 is shifted toward the two pole faces 32a and 32b, it being moved clear of the valve seat 22 in the process. The closing operation, opposite to this opening operation, of the magnet armature 25 is only caused by the fluid forces acting on the magnet armature 25, when the electromagnet means 26 is deactivated. These fluid forces are caused by the fluid, present in the valve chamber, supplied and removed by way of the valve ducts 15 and 16 and are based on the pressure differential, present at the opening 18 between the two mutually opposite base faces 28a and 28b. Spring aiding means for the switching movement 24 is accordingly not involved in any one of the switching movements.

This leads to the advantage that the magnet armature 25 may be loosely arranged in the valve chamber 14 allowing motion in the direction of the principal axis. However it is convenient to provide a position stabilizing means for the magnet armature 25 effective athwart the principal axis 3, something which can be effected by having suitable guide faces 37, which flank the magnet armature 25 at its lateral edge faces.

Owing to not having mechanical spring means particularly high switching frequencies of the magnet armature 25 are ensured.

The entire electromagnet means 26 is preferably accommodated in a housing 38 in the magnet head. The individual components may be have the housing material molded around them.

In the case of the novel solenoid valve 1 the moving magnet armature 25 may be shifted with an extremely large force and also at an extremely high speed, because between the pole face arrangement 32a and 32b and the magnet armature 25 an additional damping plate arrangement 42 is placed, same reducing the impact of the magnet armature to a reasonable level. The damping plate arrangement 42 consists of a non-ferromagnetic material, as for example aluminum or plastic material and extends at least partially over each of the differently magnetized pole faces 32a and 32b.

It is convenient for the damping plate arrangement 42 to cover at least that face section of a respective pole face 32a and 32b over which the moving magnet armature 25 also extends. In the working embodiment the two pole faces 32a and 32b, as considered in the direction of the principal axis 3, respectively completely lie within the outline of the preferably integral magnet armature 25, as is made quite clear in FIG. 2. Accordingly the damping plate arrangement 42 should extend at least over such portions.

The damping plate arrangement 42 could be composed of several separate damping plates equal in number to the number of the pole faces 32a and 32b, each pole face 32a and 32b being associated with such a separate damping plate. However it is more especially advantageous to have the design adopted in the working example, in the case of which the damping plate arrangement 42 consists of a single coherent damping plate 43, which covers all pole faces 32a and 32b.

In the case of a further embodiment, not illustrated, the damping plate arrangement 42 is located directly on the top base face 28a of the magnet armature 25 and participates in its movements. The damping plate 43 could in this case for example be attached by vulcanization, by injection molding or attached in some other suitable fashion on the moving magnet armature 25. The particular design in accordance with the working example is however considered to be particularly in which the preferably single damping plate 43 is arranged stationarily in relation to the magnet core arrangement 27, to with in such a manner that its rear side directly engages the pole faces 32a and 32b.

In order to render this possible the damping plate 43 is preferably an integral and more especially a single-structure component of the above mentioned intermediate plate 5. The intermediate plate 5 accordingly itself, with its section (arranged between the magnet armature 25 and the pole face arrangement 32a and 32b) constitute the damping plate 43. This renders possible particularly simple manufacture and fitting.

The intermediate plate 5 is preferably a component which is separate from the magnet head 4. During fitting of the magnet head 4 the same is laid at the rear against the intermediate plate 5, the pole faces 32a and 32b coming into contact with the damping plate 43.

In the case of a further possible embodiment, not illustrated, the intermediate plate 5 is part of a subassembly including the magnet head 4.

Even if no intermediate plate 5 is present, the damping plate arrangement 42 may be a direct component of the magnet head 4.

In conjunction with the intermediate plate 5 present there is the further advantage that the valve chamber 14 may be constituted jointly by the base body 2 and the intermediate plate 5. In other words in this case the intermediate plate 5 constitutes a delimiting wall, axially preceding the magnet head 6 toward the base body 2, of the valve chamber 14. A seal 44 arranged axially between the intermediate plate 5 and the base body 2, surrounds the valve chamber 14 and serves to ensure sealing at the joint of the two components.

In the working embodiment the intermediate plate 5 is seated like a lid or cover on the base body 2. Apart from the openings 13 it is gas-tight. Accordingly no pressure medium can reach the magnet head 4.

Preferably the moving magnet armature 25 is placed preceding the base body 2 in the direction toward the magnet head 4. It can be totally received within the intermediate plate 5. In this case the magnet armature 25 is seated in a recess 45 directed toward the base body 2, in the intermediate plate 5, the floor of such recess 45 itself directly constituting the damping plate 43. The above mentioned guide faces 37 are defined by the side wall of the recess 45.

In order to ensure that during the switching movement there is hardly any friction between the magnet armature 25 and the lateral guide faces 37 the magnet armature 25 is preferably arranged with a relatively large amount of play athwart the principal axis 3 in the recess 35.

The effect, reducing the impact of the magnet armature 25, of the damping plate arrangement 42 preferably results from the resilient elasticity and the additionally present damping action of the damping plate arrangement 42. These factors may be more particularly influenced by the selection of the material, the thickness measured in the direction of the switching movement 24 and the geometry of the damping plate arrangement 42. More particularly an attempt will be made to so match the structures that the permissible specific surface pressure of the material coming into contact with one another is not exceeded.

Owing to the intermediate placement of the damping plate 43 accordingly relatively powerful electromagnet means 26 may be employed to achieve high frequency movements even in the case of extremely high fluid pressures without there being a danger of damage.

As regards the geometry of the damping plate arrangement 42 a shape is for example possible in which the damping plate has a constant wall thickness at least in the portions coverings the pole face arrangement 32a and 32b and preferably all over. By a suitable selection of the wall thickness it is possible to influence the impact force of the moving magnet armature.

In the working embodiment the impact force is influenced in particular manner by a side, facing the moving magnet armature 25, of the damping plate 43, having an integrally formed surface texture or structure 46. Such texture is composed of a plurality of proud means 47 and recessed means 48. The magnet armature 25 drawn toward the pole faces 32a and 32b strikes the projecting proud means 47, which are slightly deformed unlike the case of a continuous impact face.

The surface texture 46 of the working embodiment is characterized by a plurality of rib-like proud means 47 (that are alternatingly arranged in sequence and mutually parallel) and intermediately placed groove-like recessed means 48. If it is a question of a magnet armature 25 with an elongated configuration, as is the case with the working embodiment, an alignment of the proud means 47 and recess means 48 is preferred athwart the longitudinal axis of the magnet armature 25 and more especially at a right angle to it.

A material which is particularly suitable for the damping plate arrangement 42 is a plastic, of any suitable type, which has the desired resilient and/or damping properties.

A damping plate arrangement 42 provided with a surface texture 46 may in an advantageous fashion be employed to detect the second switching position, drawn toward the magnet core arrangement 27, of the moving magnet armature 25. Such means for indication of switching positions are depicted in chained lines in FIG. 1.

In this case an electrical circuit 52 may be provided, which has two electrical conductors 53a and 53b indicated in chained lines, which lead to an external electrical processing means which is more particularly integrated in the magnet head and is not illustrated in detail. At the other ends the two conductors 53a and 53b terminate respectively at a specially provided electrically conductive contact face 54a and 54b, which are placed at the surface, facing the magnet armature 25, of two spaced part proud means 47. These contact faces 54a and 54b constitute an electrical switch together with the moving magnet armature 25, which functions as a switch element and consists of a conductive material. If the temporarily magnetic magnet armature 25 engages the damping plate arrangement 42, then owing to the simultaneous contact with the two contact faces 54a and 54b it will close the circuit 52 so that an electrical signal is produced indicating that the position has been reached.

The contact faces 54a and 54b may be formed in a relatively simple fashion by metal layers applied to the damping plate 43 which consists of nonconductive material in this case. The material layers may be applied by a metallization process, as for example during manufacture of the magnet armature 25 as a molded interconnect device (MID) component.

The invention claimed is:

1. A solenoid valve comprising a base body having valve ducts extending through it and a magnet head having an electromagnet or solenoid means, which are arranged in sequence in the direction of a principal axis and between which a valve chamber communicating with a plurality of valve ducts is located, such chamber containing a magnet armature adapted to function as a valve member and able to be shifted in the direction of the principal axis, a stationary magnet core arrangement of the electromagnet means having a pole face arrangement facing the movable magnet armature, by which pole face arrangement the movable magnet armature is attracted for electrical activation of the electromagnet means and a damping plate arrangement arranged between the pole face arrangement and the movable magnet armature, such damping plate arrangement serving for reducing magnet armature impact, wherein the movable magnet armature is designed in the form of a plate-like element with base faces aligned with the direction of the principal axis, vis-à-vis to which element a plurality of pole faces, of different magnetic polarity, of the pole face arrangement are arranged, such faces being spaced apart in a direction athwart the principal axis, said damping plate arrangement consisting of a non-ferromagnetic material and extending at least partially over each of the differently polarized pole faces.

2. The solenoid valve as set forth in claim 1, wherein the damping plate arrangement comprises a single damping plate extending simultaneously at least partly over each of the differently magnetized pole faces.

3. The solenoid valve as set forth in claim 1, wherein the damping plate arrangement is arranged stationarily in relation to the magnet core arrangement.

4. The solenoid valve as set forth in claim 1, wherein the damping plate arrangement is an integral component of an intermediate plate placed between the base body and the magnet head.

5. The solenoid valve as set forth in claim 4, wherein the damping plate arrangement is made in one piece with the intermediate plate.

6. The solenoid valve as set forth in claim 4, wherein the magnet head and the base body are braced together in the direction of the principal axis with the interposition of the intermediate plate.

7. The solenoid valve as set forth in claim 4, wherein the intermediate plate has a recess opening toward the base body, the moving magnet armature being arranged completely or partially in the recess, the floor of the recess constituting the damping plate arrangement.

8. The solenoid valve as set forth in claim 7, wherein the side wall of the recess constitutes at least one guide face for the moving magnet armature.

9. The solenoid valve as set forth in claim 4, wherein the intermediate plate constitutes a limiting wall, placed in front of the magnet head, of the valve chamber.

10. The solenoid valve as set forth in claim 9, wherein the intermediate plate defines the valve chamber jointly with the base body.

11. The solenoid valve as set forth in claim 10, wherein the intermediate plate is mounted on the base body in a sealed manner.

12. The solenoid valve as set forth in claim 1, wherein the damping plate arrangement has a continuous plate face.

13. The solenoid valve as set forth in claim 1, wherein the damping plate arrangement possesses a constant wall thickness at least in the portions thereof covering the pole face arrangement.

14. The solenoid valve as set forth in claim 1, wherein on an impact side thereof the damping plate arrangement has a surface texture comprising proud and recessed means.

15. The solenoid valve as set forth in claim 14, wherein the surface texture of the damping plate arrangement includes a plurality of mutually parallel rib-like proud and intermediately placed groove-like recessed means.

16. The solenoid valve as set forth in claim 15, wherein the moving magnet armature possesses an elongated geometry, the proud means and the recessed means extending athwart the longitudinal axis and more especially at a right angle to it.

17. The solenoid valve as set forth in claim 14, comprising switching state indicating means for the moving magnet armature, said moving magnet armature being manufactured of temporarily magnetic material, such state indicating means including a switch arranged in an electrical circuit, such switch including two electrically conductive contact faces connected with one respective conductor of the circuit, such switch furthermore having the magnet armature as a switching element, such magnet armature closing the circuit in the switching state engaging the damping plate arrangement by simultaneously making contact with the two contact faces.

18. The solenoid valve as set forth in claim 17, wherein the contact faces are constituted by metal layers on proud means of the damping plate arrangement.

19. The solenoid valve as set forth in claim 1, comprising at least one valve seat belonging to a valve duct and arranged opposite to the moving magnet armature on the bottom side facing away from the magnet head, the moving magnet armature being cleared from the valve seat, when the electromagnet means is activated, and on deactivation of the electromagnet means the magnet armature being shifted toward the valve seat, more particularly only by fluid present in the valve chamber, and held there.

20. The solenoid valve as set forth in claim 1, wherein the moving magnet armature is arranged loosely in the valve chamber for movement in the direction of the principal axis.

21. The solenoid valve as set forth in claim 1, in the form of a 2/2 directional valve.

22. The solenoid valve as set forth in claim 1, wherein the magnet core arrangement comprises a U- or E-shaped magnet core.

23. The solenoid valve as set forth in claim 1, wherein the damping plate arrangement includes a non-ferromagnetic metal.

24. The solenoid valve as set forth in claim 1, wherein the damping plate arrangement includes plastic material.

* * * * *

UNITED STATES PATENT AND TRADEMARK OFFICE
CERTIFICATE OF CORRECTION

PATENT NO. : 7,404,541 B2 Page 1 of 1
APPLICATION NO. : 11/407713
DATED : July 29, 2008
INVENTOR(S) : Berger et al.

It is certified that error appears in the above-identified patent and that said Letters Patent is hereby corrected as shown below:

Column 5, Line 35    now reads "termed the ottom base"
should read --termed the bottom base--

Signed and Sealed this

Twenty-first Day of October, 2008

JON W. DUDAS
*Director of the United States Patent and Trademark Office*